(12) United States Patent
Petridis et al.

(10) Patent No.: US 12,330,650 B2
(45) Date of Patent: Jun. 17, 2025

(54) ADAPTIVE ELECTRIC VEHICLE REGENERATIVE BRAKING

(71) Applicant: Ford Global Technologies, LLC, Dearborn, MI (US)

(72) Inventors: Themi Petridis, Bishop's Stortford (GB); Paul Etheridge, Basildon (GB)

(73) Assignee: Ford Global Technologies, LLC, Dearborn, MI (US)

(*) Notice: Subject to any disclaimer, the term of this patent is extended or adjusted under 35 U.S.C. 154(b) by 182 days.

(21) Appl. No.: 18/107,608

(22) Filed: Feb. 9, 2023

(65) Prior Publication Data
US 2024/0270251 A1 Aug. 15, 2024

(51) Int. Cl.
*B60W 30/18* (2012.01)
*B60W 40/08* (2012.01)
*B60W 40/105* (2012.01)

(52) U.S. Cl.
CPC ...... *B60W 30/18127* (2013.01); *B60W 40/08* (2013.01); *B60W 40/105* (2013.01); *B60W 2540/10* (2013.01)

(58) Field of Classification Search
CPC ............. B60W 30/18127; B60L 7/10
See application file for complete search history.

(56) References Cited

U.S. PATENT DOCUMENTS

| | | |
|---|---|---|
| 2015/0019058 A1 | 1/2015 | Georgiev |
| 2017/0015212 A1* | 1/2017 | Mitsuoka ............... B60L 7/14 |
| 2018/0118034 A1* | 5/2018 | Zenner ................. F16D 61/00 |
| 2018/0134161 A1* | 5/2018 | Gaither ................. B60L 7/26 |
| 2018/0215272 A1* | 8/2018 | Vitullo .................. B60L 7/18 |
| 2018/0297475 A1* | 10/2018 | Zhao .................... B60L 7/18 |
| 2020/0039498 A1* | 2/2020 | Passman ......... B60W 30/18127 |
| 2022/0234597 A1* | 7/2022 | Kiriki ................ B60W 40/09 |
| 2022/0250620 A1* | 8/2022 | Hu .................... B60W 10/06 |

* cited by examiner

*Primary Examiner* — Long T Tran
(74) *Attorney, Agent, or Firm* — Haley Guiliano LLP

(57) ABSTRACT

Systems and methods for activating a regenerative braking profile of a first vehicle are provided. A plurality of driving signals are received from the first vehicle. The driving signals are associated with a first driver of the first vehicle. It is detected that the first driver is attempting to maintain a steady vehicle speed based on the driving signals from the first vehicle, and in response to the detection of the first driver attempting to maintain a steady vehicle speed, a first regenerative braking profile based on the plurality of driving signals is activated.

16 Claims, 11 Drawing Sheets

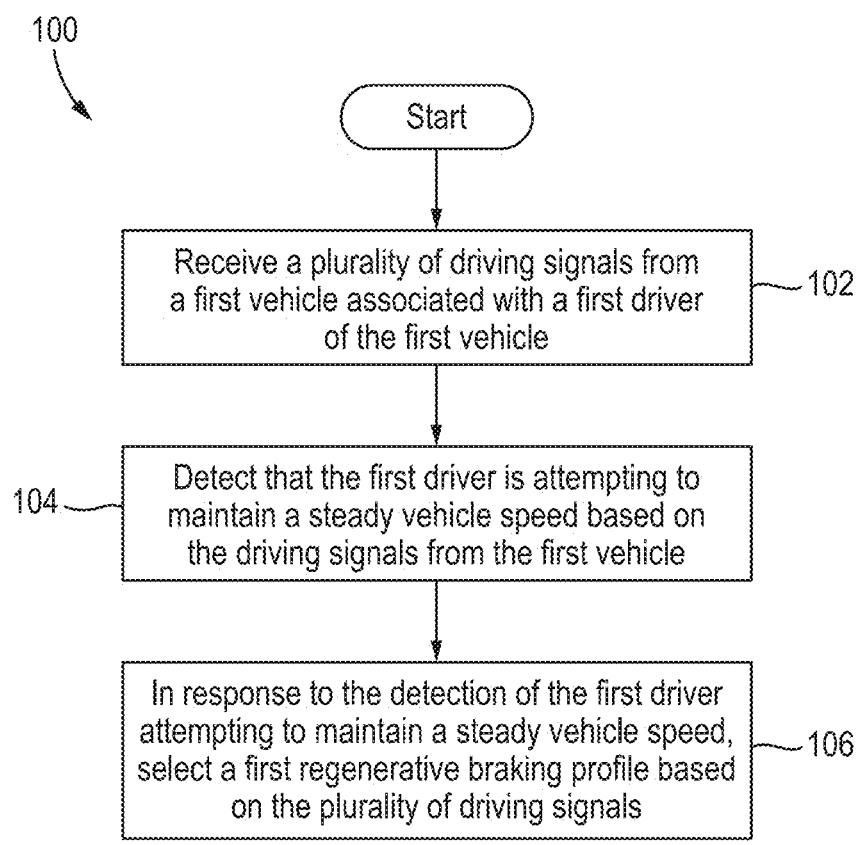

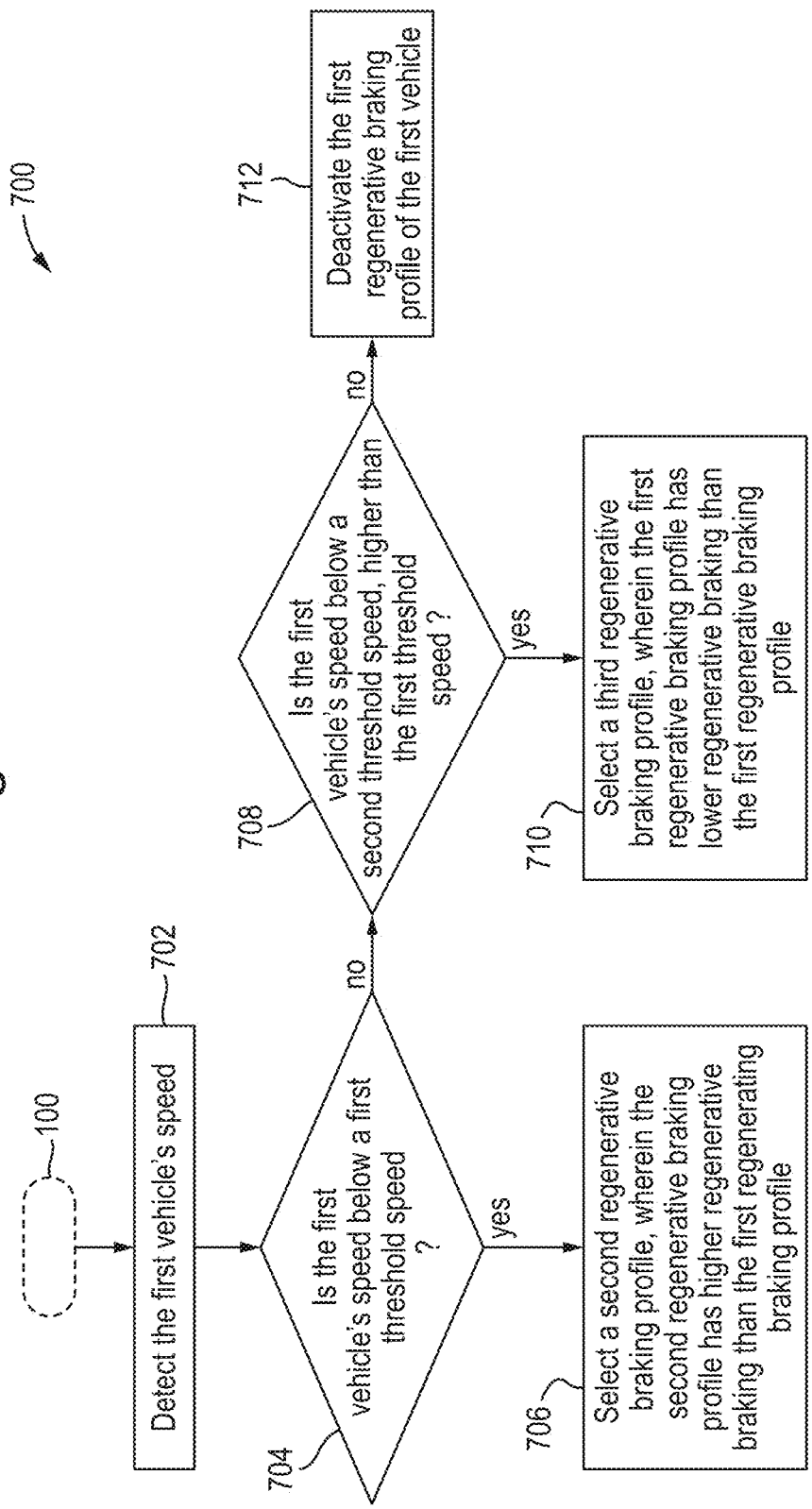

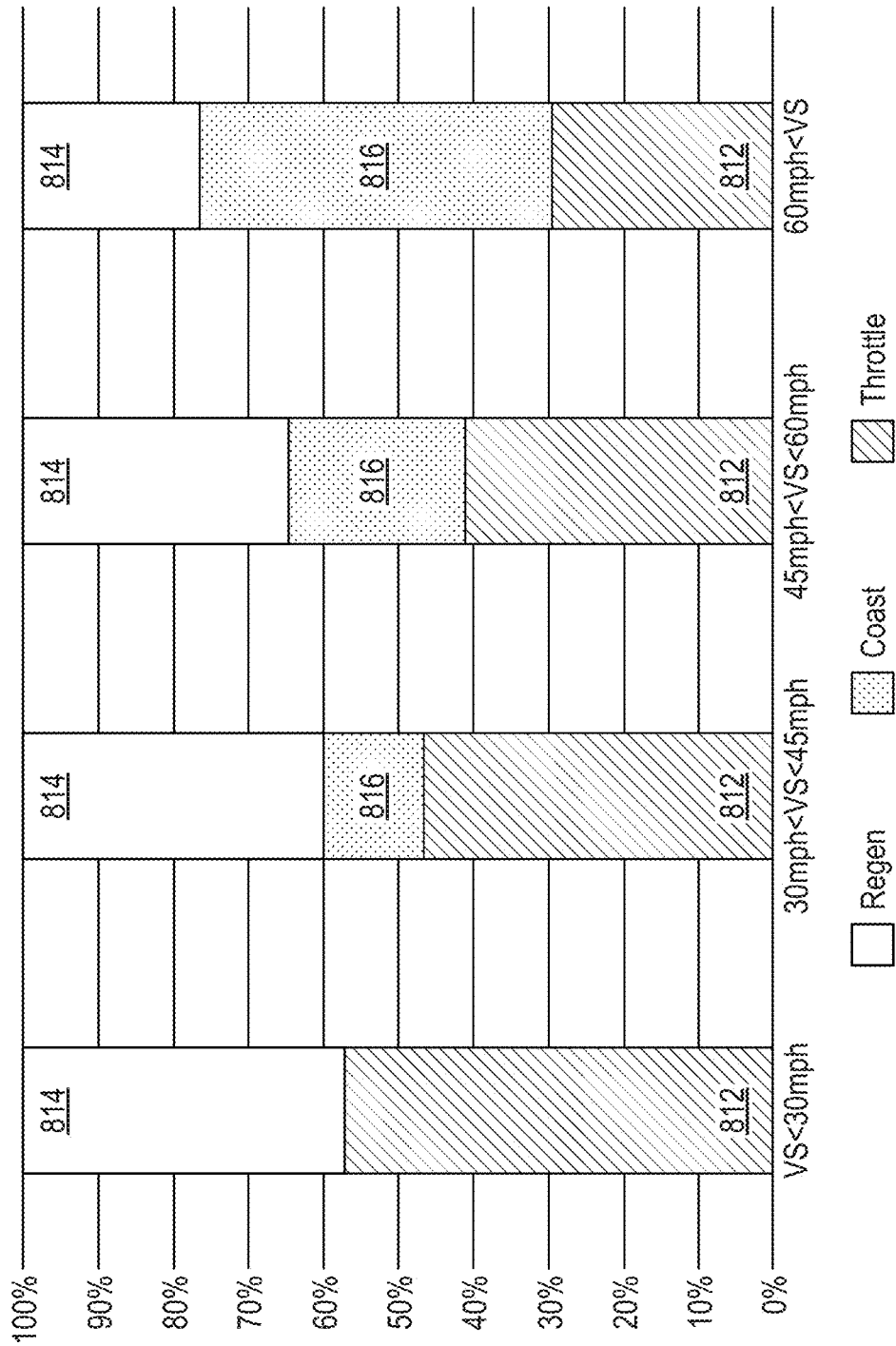

ADAPTIVE ELECTRIC VEHICLE REGENERATIVE BRAKING

FIELD

The present disclosure relates to systems for electric vehicle regenerative braking and, more particularly, to systems and related processes for adapting regenerative braking profiles of a vehicle based on use case scenarios.

BACKGROUND

Advances in electric vehicle (EV) and hybrid electric vehicle (HEV) technology have led to the advent of one-pedal driving. One-pedal driving refers to a driving technique where the driver uses only the accelerator pedal to control the speed of the vehicle, instead of using both the accelerator and brake pedals. This is typically used in electric vehicles and hybrid vehicles that have regenerative braking systems, which convert the energy from braking into electricity that can be used to recharge the battery. In hybrid vehicles, this driving mode can also better the fuel efficiency and reduce wear on the brake pads.

In one pedal driving mode, when lifting off the accelerator, regenerative braking is increased, this has been found to be less efficient in some circumstances when compared to coasting. In particular, when attempting to maintain constant high vehicle speeds (e.g., over 50 mph), driver pedal behaviour oscillates around an ideal point that causes regenerative breaking to be activated and deactivated repeatedly. Regenerative braking is not 100% efficient. There are several factors that can affect the efficiency of regenerative braking systems, such as the design of the system, the speed of the vehicle, and the condition of the battery. In general, the efficiency of regenerative braking systems can range from around 50% to as high as 90%. However, it's important to note that even when the system is not 100% efficient, it can still provide a significant benefit in terms of extending the range of the vehicle and reducing wear on the mechanical brakes. Accordingly, energy is lost when compared to coasting without regenerative braking, therefore, a solution is needed to better the control of adaptive braking activation and deactivation.

SUMMARY

There are proposed herein systems and methods that adapt the regenerative braking profile of the vehicle based on use case scenarios. Regenerative braking profiles refer to the different levels of regenerative braking that can be selected by the driver or programmed into the vehicle's control system. These profiles allow the driver to customize the level of regenerative braking to suit their driving style and preferences. For example, some electric vehicles offer different levels of regenerative braking, ranging from "low" to "high" or even "off", which affects how much energy is captured during braking, the level of deceleration, and the level of brake pedal feel. The proposed solutions use custom regenerative braking profiles, allowing the fine-tuning of regenerative braking unique to the driving style of the driver or based on vehicle headway, and the like.

By way of summary, regenerative breaking is linked to the driver's pedal usage profile. Each driver has a unique pedal profile when driving a vehicle, which can be influenced by factors such as their driving style, experience level, and the type of vehicle they are driving. For example, a more experienced driver may use the accelerator and brake pedals more smoothly and consistently, while a less experienced driver may use them more abruptly. In a first use case, the driver's unique "pedal oscillation profile" the driver inputs while trying to maintain a steady vehicle speed is learned, and the regenerative profile is adjusted to move the regenerative breaking point below the drivers' minima in their oscillation.

Accordingly, there is provided a method for activating (or selecting) a regenerative braking profile of a first vehicle, the method comprising: receiving a plurality of driving signals from the first vehicle associated with a first driver of the first vehicle; detecting that the first driver is attempting to maintain a steady vehicle speed based on the driving signals from the first vehicle; and in response to the detection of the first driver attempting to maintain a steady vehicle speed, activating (or selecting) a first regenerative braking profile based on the plurality of driving signals. In some examples, a regenerative braking system is operated/controlled to harvest electrical energy according to the current active regenerative braking profile.

In some examples, the method further comprises operating a regenerative braking device in accordance with the activated regenerative braking profile. In some examples, the driving signals comprise a pedal oscillation profile. In some examples, the pedal oscillation profile of the first driver comprises a minimum, e.g., an inflection point on a curve defining the pedal oscillation profile. In some examples, the pedal oscillation profile comprises (or is defined by) an accelerator signal, a brake signal, or a speed signal of the first vehicle. In some examples, the method further comprises adjusting the first regenerative braking profile to move a regenerative braking point below the minimum in the pedal oscillation profile.

Regenerative braking may also be applied as a function of vehicle headway. Vehicle headway refers to the distance between a vehicle and the vehicle in front of it, typically measured in time or distance. In a first use case, a vehicle is detected in front of the driver's vehicle, and within a threshold distance or time, in this example, full regenerative braking is activated as per a nominal driver profile. In a second use case, a vehicle is detected in front of the driver's vehicle, and outside a first threshold distance or time, in this example, a relatively lower regenerative braking profile is activated when compared to the nominal driver profile. In a third use case, no vehicle is detected in front of the driver's vehicle, in this example, regenerative braking is deactivated, and the vehicle will coast upon lifting of the throttle instead.

Accordingly, in some examples, the method further comprises detecting a second vehicle in front of the first vehicle; determining that the second vehicle is within a threshold distance; and activating (or selecting) a second regenerative braking profile, wherein the second regenerative braking profile has higher regenerative braking, e.g., a higher level of regenerative braking, than the first regenerating braking profile. In some examples, In some examples, the method further comprises determining that the second vehicle is outside the threshold distance; and activating (or selecting) a third regenerative braking profile, wherein the third regenerative braking profile has lower regenerative braking, e.g., a lower level of regenerative braking, than the first regenerative braking profile.

In some examples, the method further comprises detecting a clear headway in front of the first vehicle; and in response, deactivating the first regenerative braking profile of the first vehicle, wherein the first vehicle will coast upon lifting of an accelerator. For example, deactivating the first regenerative braking profile of the first vehicle may allow the the first vehicle to coast upon lifting, or release, of an accelerator control, such as a pedal.

Regenerative braking may also be applied as a function of vehicle speed (VS). In a first use case, the vehicle speed is detected to be below a first threshold (e.g., VS<40 mph), in this example, full regenerative braking is activated as per the nominal driver profile. In a second use case, the vehicle speed is detected to be between the first threshold and a second threshold speed (e.g., 40 mph<VS<60 mph), in this example, a relatively lower regenerative breaking activated when compared to the nominal driver profile. In a third use case, the vehicle speed is detected to be above the second threshold speed (e.g., VS>60 mph), in this example, regenerative braking is deactivated, and the vehicle will coast upon lifting off the throttle instead. In some examples, the amount of regenerative braking and the vehicle speed are inversely proportional.

In some examples, the method further comprises determining the first vehicle's speed; determining that the first vehicle's speed is below a first threshold speed; and activating (or selecting) a second regenerative braking profile, wherein the second regenerative braking profile has higher regenerative braking than the first regenerating braking profile.

In some examples, the method further comprises determining that the first vehicle's speed is above the first threshold speed but below a second threshold speed; and activating (or selecting) a third regenerative braking profile, wherein the third regenerative braking profile has lower regenerative braking than the first regenerative braking profile.

In some examples, the method further comprises determining that the first vehicle's speed is above the first threshold speed and above the second threshold speed; and in response, deactivating the first regenerative braking profile of the first vehicle, wherein the first vehicle will coast upon lifting of an accelerator.

In another approach, there is provided a regenerative braking system for a vehicle, the system comprising input/output, IO, circuitry configured to receive a plurality of driving signals from the vehicle associated with a first driver of the vehicle; and control circuitry configured to: detect that the first driver is attempting to maintain a steady vehicle speed based on the driving signals from the vehicle; and in response to the detection of the first driver attempting to maintain a steady vehicle speed, select a first regenerative braking profile from the storage based on the plurality of driving signals.

In another approach, there is provided a vehicle comprising a regenerative braking system for a vehicle, the system comprising input/output, IO, circuitry configured to receive a plurality of driving signals from the vehicle associated with a first driver of the vehicle; and control circuitry configured to: detect that the first driver is attempting to maintain a steady vehicle speed based on the driving signals from the vehicle; and in response to the detection of the first driver attempting to maintain a steady vehicle speed, select a first regenerative braking profile from the storage based on the plurality of driving signals.

In another approach, there is provided a non-transitory computer-readable medium, having instructions recorded thereon for activating (or selecting) a regenerative braking profile of a first vehicle, the instructions, when executed, cause control circuitry to: receive a plurality of driving signals from the first vehicle associated with a first driver of the first vehicle; detect that the first driver is attempting to maintain a steady vehicle speed based on the driving signals from the first vehicle; and in response to the detection of the first driver attempting to maintain a steady vehicle speed, activate (or select) a first regenerative braking profile based on the plurality of driving signals.

BRIEF DESCRIPTION OF THE DRAWINGS

The above and other objects and advantages of the disclosure will be apparent upon consideration of the following detailed description, taken in conjunction with the accompanying drawings, in which:

FIG. 1 is an illustrative flowchart of a process for adapting a regenerative braking profile of a vehicle, in accordance with some examples of the present disclosure;

FIG. 7 is an illustrative flowchart of a process for adapting a regenerative braking profile of a vehicle based on vehicle speed, in accordance with some examples of the present disclosure;

FIG. 8 illustrates regenerative braking profiles based on vehicle speed, in accordance with some other examples of the present disclosure;

DETAILED DESCRIPTION

Figure 2A:
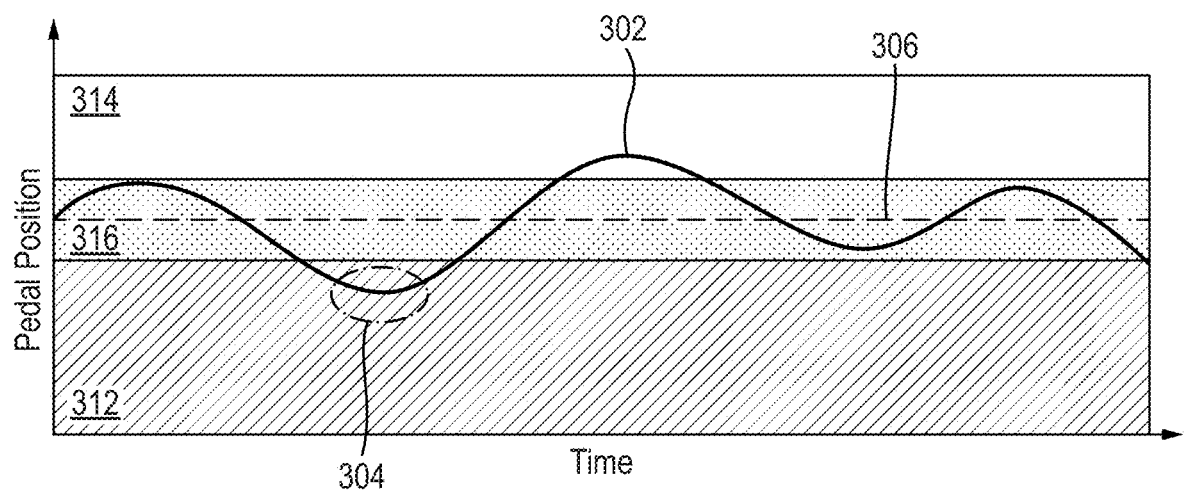
FIGS. 2A and 2B illustrate a unique driver pedal profile and regenerative braking profiles adapted to match the unique driver pedal profile, in accordance with some examples of the present disclosure.

As described briefly above, regenerative braking in a hybrid electric vehicle (HEV) or an electric vehicle (EV) is a method of capturing the energy that is typically lost during braking and using it to recharge the vehicle's battery. When the driver applies the brakes, or lifts off the accelerator (i.e., the throttle) the electric motor that powers the vehicle becomes a generator, converting the kinetic energy of the moving vehicle into electrical energy. This electrical energy is then used to recharge the battery, extending the range of the vehicle. In addition to increasing the efficiency of the vehicle, regenerative braking also provides a smoother braking experience, as it reduces the need for traditional friction brakes.

The benefits of regenerative braking in HEVs/EVs are numerous. One of the main advantages is that it increases the efficiency of the vehicle, as it captures and reuses energy that would otherwise be lost during braking. This results in a longer range for the vehicle, as less energy is needed to recharge the battery. Additionally, regenerative braking provides a smoother braking experience, as it reduces the need for traditional friction brakes. This results in less wear and tear on the brake pads (and thus fewer particulate emissions) and a more comfortable driving experience. Regenerative braking also has a positive effect on the overall performance of the vehicle. It allows (H)EVs to recover energy while slowing down, which results in a more energy-efficient drive. This increased efficiency can help to reduce the overall investment of ownership of the vehicle, as less energy is needed to recharge the battery. As the demand for HEVs/EVs continues to grow, regenerative braking will play an increasingly important role in the development of these vehicles.

Some vehicles operate in a one-pedal driving mode. The amount of pedal lift required to activate regenerative braking in one-pedal driving mode can vary depending on the vehicle and the specific system used. Some systems may require the driver to lift the accelerator pedal all the way to the top to activate regenerative braking, while others may only require a small amount of pedal lift. However, in general, the amount of pedal lift required to activate regenerative braking in one-pedal driving mode is designed to be as small as possible to make it easy for the driver to use. For example, some systems may use a "creep" feature, where the vehicle will automatically begin to slow down and activate regenerative braking when the driver takes their foot off the accelerator pedal, without requiring them to lift the pedal at all.

Additionally, some systems can be configured to allow the driver to adjust the sensitivity of the accelerator pedal, which can affect how much pedal lift is required to activate regenerative braking. In those cases, the driver can adjust the settings to their preference, allowing them to activate regenerative braking with a minimal pedal lift. Furthermore, some systems can automatically configure or adjust the sensitivity of the pedal, which can affect how much pedal lift is required to activate regenerative braking. In those cases, learning driver behaviour can enable a greater granularity of adjustment, allowing for a greater increase in efficiency of the overall system, advancing further all the benefits mentioned above.

FIG. 1 is an illustrative flowchart of a process for adapting a regenerative braking profile of a vehicle, in accordance with some examples of the present disclosure. Process 100 starts at step 102. At step 102, a plurality of driving signals is received from a first vehicle associated with a first driver of the first vehicle. For example, input/output circuitry (e.g., circuitry 1212 of FIG. 12) of a computing device (e.g., onboard computer of a vehicle, computing module 1202) may receive a plurality of driving signals from a first vehicle associated with a first driver of the first vehicle. At step 104, it is detected that the first driver is attempting to maintain a steady vehicle speed based on the driving signals from the first vehicle. For example, control circuitry (e.g., circuitry 1210 of FIG. 12) of the computing device may detect that the first driver is attempting to maintain a steady vehicle speed based on the driving signals from the first vehicle. In some examples, the driving signals comprise a pedal oscillation profile. In some examples, the pedal oscillation profile comprises: an accelerator signal, a brake signal, and/or a speed signal of the first vehicle.

Figure 2B:
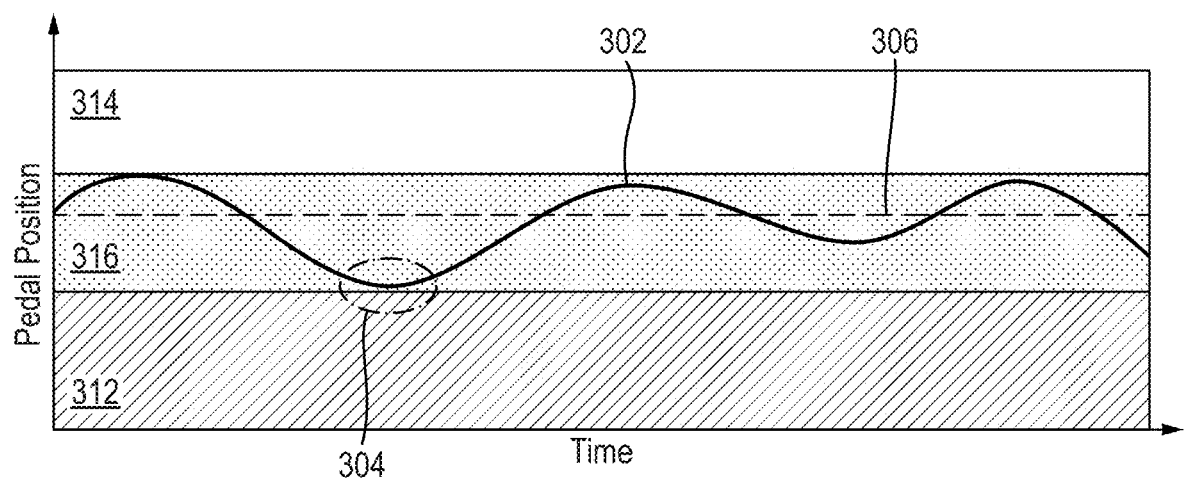

For example, in one-pedal driving mode, it can be detected that the driver is attempting to maintain speed by increasing and decreasing the amount by which they press the pedal. Typically, as shown in FIGS. 2A and 2B, the user is oscillating the pedal around an average point. In some examples, process 100 further comprises determining an average point of the pedal oscillation, detecting the change in the pedal oscillation average is below a threshold and then determining that the first driver is attempting to maintain a steady vehicle speed in this way.

At step 106, in response to the detection of the first driver attempting to maintain a steady vehicle speed, a first regenerative braking profile is selected based on the plurality of driving signals. For example, in response to the detection of the first driver attempting to maintain a steady vehicle speed, the control circuitry of the computing device may activate a first regenerative braking profile based on the plurality of driving signals. It is possible to adapt the regenerative braking profile of an EV based on a driver's unique pedal usage profile, as will be explained in more detail with reference to FIGS. 2A-2B below. This can be done by tracking the driver's braking habits over time, such as how hard and how often they brake, how much time they spend braking, and how quickly they release the brake pedal. With this information, the EV's regenerative braking system can be adjusted to match the driver's unique braking habits.

For example, if a driver tends to brake hard and often, the regenerative braking profile can be adjusted to capture more energy during braking. This will help to recharge the battery more quickly and extend the range of the vehicle. On the other hand, if a driver tends to brake more gently and less frequently, the regenerative braking profile can be adjusted to capture less energy during braking. This will reduce the amount of deceleration and provide a more comfortable driving experience for the driver.

It's worth noting that this method requires a system to track the driver's pedal usage profile, such as a pedal sensor, and a control system that can adjust the regenerative braking profile accordingly. Additionally, this method can be combined with other systems and methodologies such as GPS-based settings, road condition detection, vehicle headway, or vehicle speed to optimize the energy captured by the regenerative braking system and advance the overall performance of the EV.

Some vehicles also offer different modes, such as "low" and "high" regenerative braking, which allows the driver to select the level of regenerative braking that is most comfortable for them. In some examples, the vehicle can set a custom regenerative braking profile for the driver, fine-tuning the level of regenerative braking to their liking based on their pedal usage.

FIGS. 2A and 2B illustrate a unique driver pedal profile 302 and regenerative braking profiles 312-316 adapted to match the unique driver pedal profile, in accordance with some embodiments of the present disclosure. Each driver may have a unique pedal profile 302 when driving a vehicle, which can be influenced by factors such as their driving style, experience level, and the type of vehicle they are driving. For example, a more experienced driver may use the accelerator and brake pedals more smoothly and consistently, while a less experienced driver may use them more abruptly.

In some examples, the pedal oscillation profile 302 of the first driver comprises a minimum 304. As shown in FIGS. 2A-2B, in the regenerative braking profile there is typically a regeneration (regen) zone 312, an acceleration zone 314, and in some examples, a coasting zone 316. The pedal oscillation profile in FIGS. 2A-2B comprises an accelerator signal only, as the vehicle in this example is using one-pedal driving mode. The pedal signal 302 is largely in the coasting zone 316 as the driver is attempting to maintain a speed. However, the driver accidentally or unknowingly lifted the pedal too far and entered into the regen zone 312, as shown by minimum point 304. This would could a significant amount of deceleration when compared to the coasting zone 316. After, the driver then had to accelerate, shown by the pedal signal 302 moving into the acceleration zone 314 of the profile, to return to their desired speed.

As the regeneration of the braking system is not 100% efficient, and never will be, energy is lost due to this circumstance. In particular, if the system knew the driver was attempting to maintain speed, it could have ignored the minimum. Perhaps in a situation where the car was heading downhill and the driver purposefully lifted the accelerator to allow the vehicle to speed under acceleration due to gravity. Or, the driver wanted the vehicle to naturally slow down but without active deceleration.

Accordingly, in some examples, process 100 further comprises adjusting the first regenerative braking profile to move a regenerative braking point below the minimum in the pedal oscillation profile. This is shown in FIGS. 2A-2B by the regen zone 312, which includes minimum 304 in FIG. 2A to below the minimum 304 in FIG. 2B. In this way, the vehicle will now coast at the minimum point 304, and further acceleration was not needed. Overall, more efficient use of battery energy has occurred.

There are a plurality of additional ways in which the regenerative braking profile of an HEV/EV can be adapted based on different use case scenarios. For example:

Adapting regenerative braking settings: Many EVs today come with a adjustable regenerative braking setting that allows the driver to choose how much energy is captured and returned to the battery during braking. This can be useful for different driving scenarios, such as city driving where the driver may want to capture more energy during braking to extend the range of the vehicle, or highway driving where the driver may want less regenerative braking to reduce the amount of deceleration.

Predictive braking: using predictive braking technology can anticipate when the driver is going to brake and adjust the regenerative braking profile accordingly. This can help to optimize the amount of energy captured during braking and advance the overall efficiency of the vehicle.

GPS-based settings: using GPS data to adjust the regenerative braking profile based on the location of the vehicle. For example, if the vehicle is approaching a downhill section of the road, the regenerative braking profile can be adjusted to capture more energy during braking to help recharge the battery.

Adaptive Cruise Control (ACC): using Adaptive Cruise Control (ACC) technology can use the radar sensor to detect the speed of the vehicle in front of it and adjust the regenerative braking profile accordingly. This can help to optimize the amount of energy captured during braking and advance the overall efficiency of the vehicle.

Programmable logic controller (PLC): A programmable logic controller (PLC) is a microprocessor-based device that can be programmed to adapt the regenerative braking profile of the vehicle based on specific use case scenarios, like the speed of the vehicle, the battery state of charge, or the driver's braking habits.

Road condition detection: using the vehicle's onboard sensors to detect the road conditions, such as the presence of rain, ice, or snow. Based on this information, the regenerative braking profile can be adjusted to capture more energy during braking, providing additional control for the driver.

Route planning: utilizing the ability to access route planning data and use it to adjust the regenerative braking profile accordingly. For example, if the vehicle is approaching a section of the road with a lot of stop signs or traffic lights, the regenerative braking profile can be adjusted to capture more energy during braking to help recharge the battery.

Additionally, each driver may have their own preferences and habits when it comes to how they use the accelerator and brake pedals, which can affect their pedal profile. For example, some drivers may prefer to use the accelerator pedal more frequently to maintain a steady speed, while others may prefer to use the brake pedal more frequently to slow down and maintain the appropriate following distance.

Any one of the above, or a combination thereof, ways in which the regenerative braking profile of an HEV/EV can be adapted based on different use case scenarios can be fed into the vehicle's control system to recognize and adapt to the driver's pedal usage patterns over time and adjust the regenerative braking profile accordingly, for example by increasing the regenerative braking zone 312 if the driver frequently uses the brake pedal, or increasing the size of the coasting zone 316.

Figure 3:
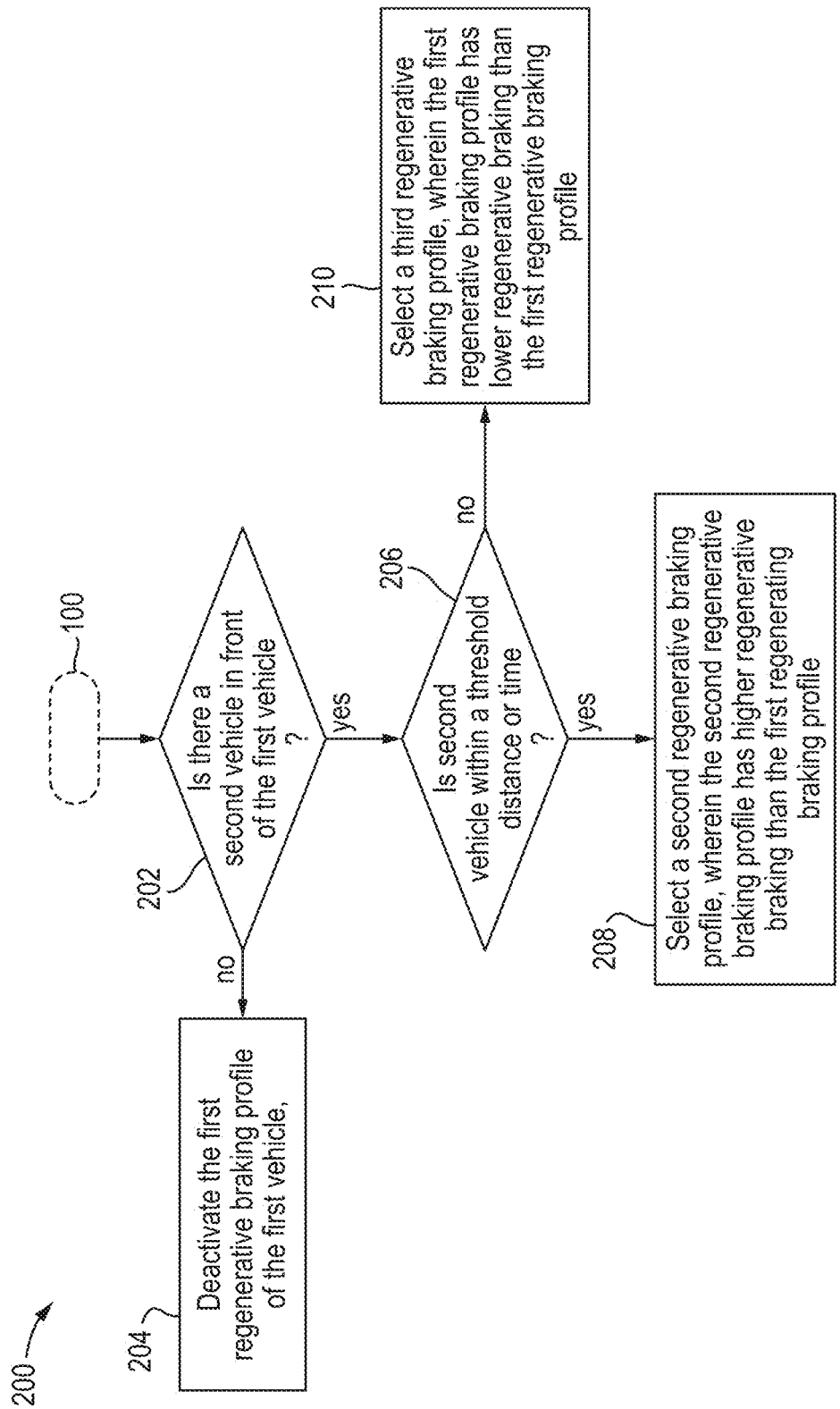
FIG. 3 is an illustrative flowchart of a process for adapting a regenerative braking profile of a vehicle based on vehicle headway, in accordance with some other examples of the present disclosure.

FIG. 3 is an illustrative flowchart of a process for adapting a regenerative braking profile of a vehicle, in accordance with some other examples of the present disclosure. Vehicle headway refers to the distance between a vehicle and the vehicle in front of it. It is typically measured in time or distance. In traffic engineering and transportation planning, headway is an important parameter used to analyze traffic flow and traffic. A shorter headway means that vehicles are following each other more closely, which can lead to increased traffic congestion. A longer headway, on the other hand, allows for more space between vehicles and can lead to a smoother flow of traffic. Headway is often measured in time or in distance, and in some cases, it is used to determine the optimal speed limit for a particular stretch of road.

Process 200 begins at step 202. Step 202 may follow process 100, or may be carried out in parallel to process 100. In some embodiments, the steps of process 200 (e.g., steps 202-208) are implemented by control circuitry (e.g., circuitry 1210 of FIG. 12) of a computing device (e.g., onboard computer of a vehicle, computing module 1202). At step 202, it is determined if there is a second vehicle in front of the first vehicle. In some examples, the HEV/EV control system can adapt the regenerative braking profile based on vehicle headway. By measuring the headway between the EV and the vehicle in front of it, the EV's regenerative braking system can adjust the amount of energy captured during braking. If the answer to step 202 is no, process 200 continues on to step 204. If the answer to step 202 is yes, process 200 continues on to step 206.

At step 204, where no vehicle is detected in the headway of the present first vehicle, the first regenerative braking profile of the first vehicle is deactivated. Accordingly, the first vehicle will coast upon lifting of the accelerator.

At step 206, it is determined if the second vehicle is within a threshold distance or time. If the answer to step 206 is yes, process 200 continues on to step 208. If the answer to step 206 is no, process 200 continues on to step 210. For example, if the vehicle is far away from a next vehicle and the headway is therefore large, the regenerative braking profile can be adjusted to capture less energy during braking. This would allow the driver to lift of the accelerator and no active deceleration will occur, the vehicle will coast. On the other hand, if the EV is following a vehicle at a shorter distance and the headway is small, the regenerative braking profile can be adjusted to capture more energy during braking. This would allow the EV to reduce its speed more quickly and maintain the appropriate distance from the vehicle in front.

Accordingly, at step 208, a second regenerative braking profile is selected, wherein the second regenerative braking profile has higher regenerative braking than the first regenerating braking profile. At step 210, a third regenerative braking profile is selected, wherein the third regenerative braking profile has lower regenerative braking than the first regenerative braking profile. The relative sizes of the regenerative braking zones 312-316 are described by way of example with regard to FIGS. 4A-6B.

In some examples, sensors on the vehicle to detect the headway and a control system that can adjust the regenerative braking profile accordingly. Furthermore, these methods can be combined with other systems and methodologies such as ACC, GPS-based settings, or road condition detection to optimize the energy captured by the regenerative braking system and advance the overall performance of the EV.

Figure 4A:
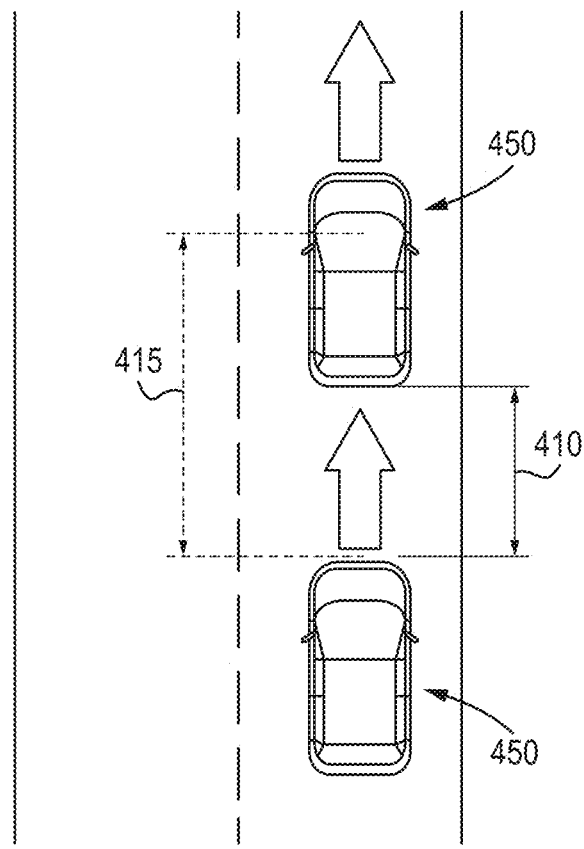
FIGS. 4A-6B illustrate regenerative braking profiles based on vehicle headway, in accordance with some other examples of the present disclosure.
Figure 4B:
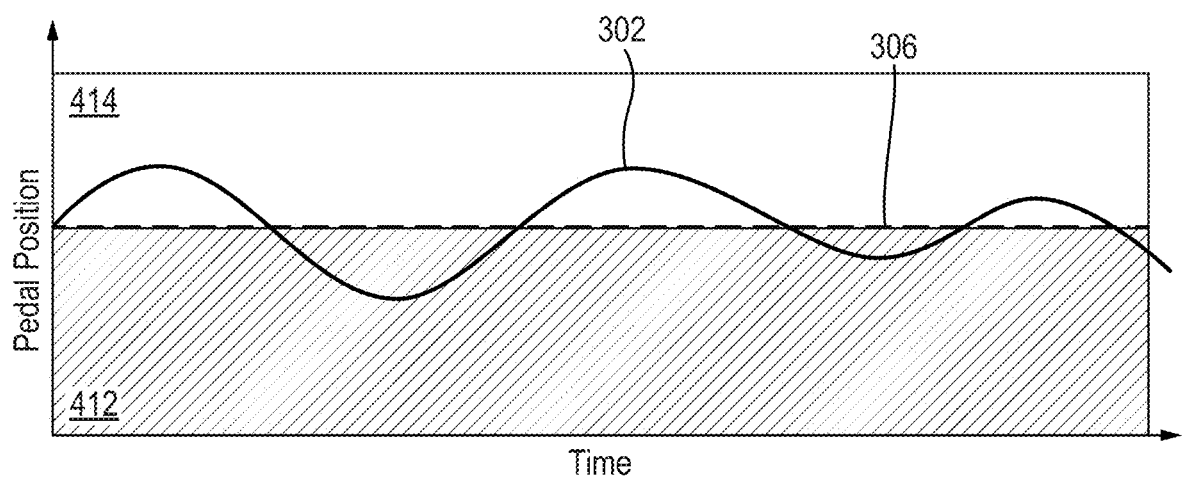

FIGS. 4A-6B illustrate regenerative braking profiles based on vehicle headway, in accordance with examples of the present disclosure. FIGS. 4A-4B show an example scenario where a second vehicle 455 is within a first threshold distance 415 of a first vehicle 450. As shown by distance 410 being shorter than distance 415. FIG. 4B in particular shows a regenerative braking profile with no coasting zone, but with a relatively large regen zone 412 and acceleration zone 416. The regen zone 412 and acceleration zone meet around the average point of the driver's pedal position. This is because in all scenarios of FIGS. 4-6B, the driver is attempting to maintain a constant speed.

Vehicle headway can influence a regenerative braking profile by allowing the vehicle to capture more energy during braking when there is less space between it and the vehicle in front. When the vehicle is following another vehicle closely, the system may select a regenerative braking profile, such as that shown in FIG. 4B, in order to have more control over the speed of the vehicle.

Figure 5A:
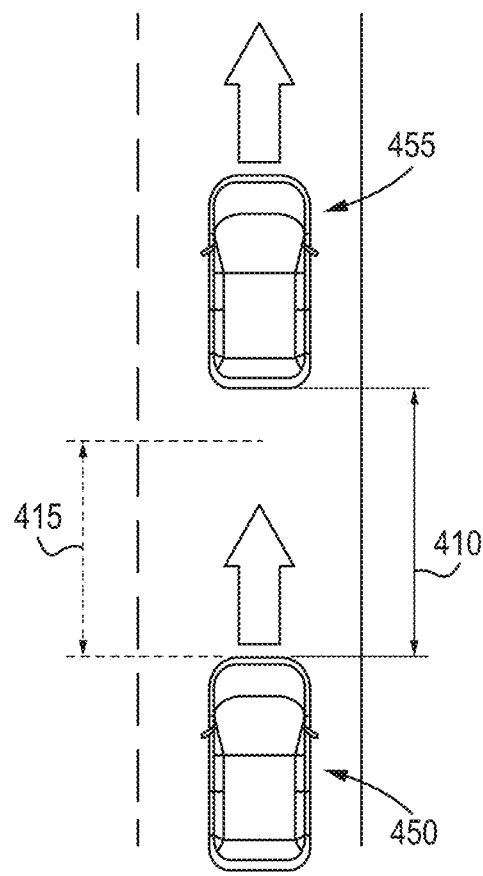
Figure 5B:
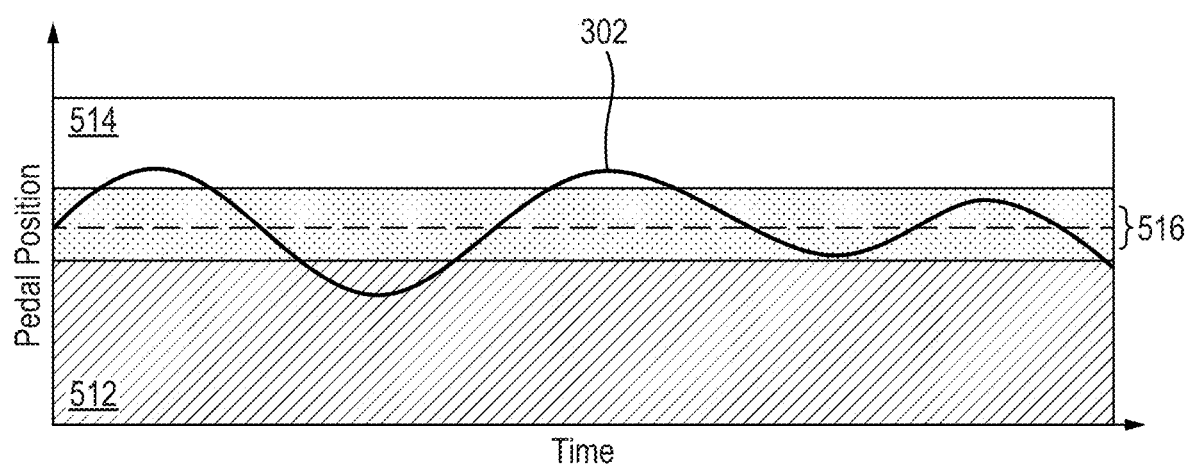

FIGS. 5A-5B show an example scenario where a second vehicle 455 is detected, but it is not within the first threshold distance 415 of a first vehicle 450. As shown by distance 410 being greater than distance 415. FIG. 5B in particular shows a regenerative braking profile with a small coasting zone 516, and a regen zone 512 and acceleration zone 516 that are smaller than the example in FIGS. 4A-4B, due to the second vehicle 455 being outside the first threshold distance. The coasting zone 516 is centred substantially around the average point of the driver's pedal position as the driver is attempting to maintain a constant speed.

Figure 6A:
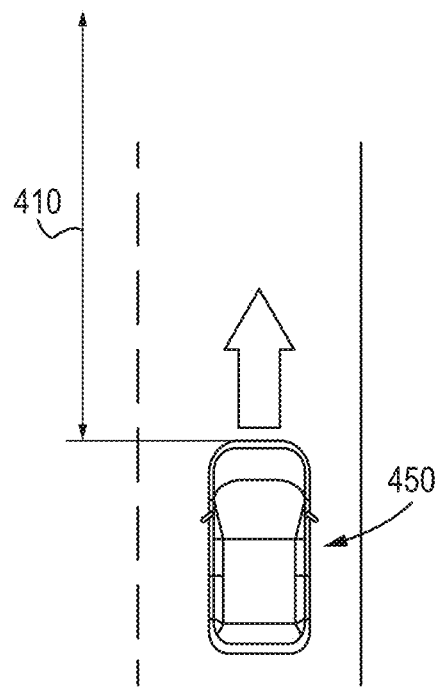
Figure 6B:
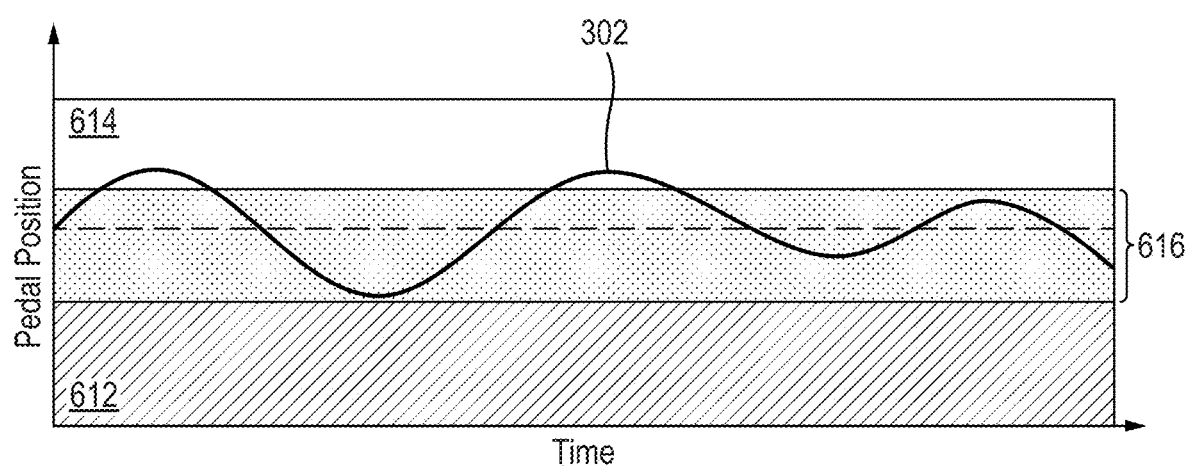

FIGS. 6A-6B show an example scenario where no vehicle 455 is detected within the headway 410 of the first vehicle. FIG. 6B in particular shows a regenerative braking profile with a larger coasting zone 616, and a regen zone 612 and acceleration zone 616 that are smaller than the example in FIGS. 5A-5B, due to no second vehicle 455 being detected within the first threshold distance. The coasting zone 616 is centred substantially around the average point of the driver's pedal position as the driver is attempting to maintain a constant speed. In the example shown, the coasting zone 616 is biased toward being centred below the average point of the driver's pedal position, as this particular driver prefers coasting.

Regenerative braking systems in electric and hybrid vehicles are often designed to capture more energy when the vehicle is decelerating at a higher rate. By adjusting the regenerative braking profile based on the vehicle's headway, the driver can maximize the amount of energy captured during braking and maximize the range of the vehicle.

Additionally, vehicle headway can be used by the vehicle's advanced driver-assistance systems (ADAS) to adjust the regenerative braking profile. For example, if the vehicle's sensors detect that the vehicle in front is getting closer, the system could automatically adjust the regenerative braking profile accordingly.

There are several ways to make a regenerative braking profile based on a driver's unique pedal usage profile more granular. For example:

Use more advanced sensors: By using more advanced sensors, such as force sensors or position sensors, the EV's control system can track more detailed information about the driver's braking habits, such as how hard the brake pedal is pressed and how quickly it is released. This allows the EV's regenerative braking system to be adjusted more precisely to match the driver's unique braking habits.

Use machine learning algorithms: By using machine learning algorithms, the EV's control system can learn the driver's unique braking habits over time and make adjustments to the regenerative braking profile more accurately. This can be done by collecting data from the sensors and analyzing it to identify patterns in the driver's braking habits.

Track additional parameters: By tracking additional parameters, such as the vehicle's speed, road conditions, and the driver's acceleration habits, the EV's control system can make more accurate adjustments to the regenerative braking profile. This can be done by collecting data from sensors and analyzing it to identify patterns in the driver's braking habits.

Personalized settings: By allowing the driver to personalize their own regenerative braking settings, the EV's control system can make more accurate adjustments to the regenerative braking profile. This can be done by using the driver's feedback, such as the driver's preferred level of deceleration, and adjusting the regenerative braking profile accordingly.

FIG. 7 is an illustrative flowchart of a process for adapting a regenerative braking profile of a vehicle, in accordance with some examples of the present disclosure. Vehicle speed can influence a regenerative braking profile by affecting the amount of energy that can be captured during braking. At higher speeds, the vehicle has more kinetic energy, which means that more energy can be captured during braking. As the vehicle slows down, the amount of energy that can be captured during braking decreases.

As a result, regenerative braking systems in electric and hybrid vehicles are often designed to capture more energy when the vehicle is traveling at higher speeds. This means that at higher speeds, the system may choose a higher level of regenerative braking to maximize energy capture and expand the vehicle's range. On the other hand, when the vehicle is traveling at lower speeds, the driver may choose a lower level of regenerative braking to have more control over the speed of the vehicle and prevent sudden deceleration.

Process 700 begins at step 702. In some embodiments, the steps of process 700 (e.g., steps 702-712) are implemented by control circuitry (e.g., circuitry 1210 of FIG. 12) of a computing device (e.g., onboard computer of a vehicle, computing module 1202). Step 702 may follow process 100 or 200, or may be carried out in parallel to process 100 or 200. At step 702 the first vehicle's speed is detected. At step 704, it is determined if the first vehicle's speed is below a first threshold speed. If the answer to step 704 is yes, process 700 continues on to step 706. If the answer to step 704 is no, process 700 continues on to step 708.

At step 706, a second regenerative braking profile is selected or activated, wherein the second regenerative braking profile has higher regenerative braking than the first regenerating braking profile. At step 708, it is determined if the first vehicle's speed is below a second threshold speed, higher than the first threshold speed. If the answer to step 708 is yes, process 700 continues on to step 710. If the answer to step 704 is no, process 700 continues on to step 712.

At step 710, a third regenerative braking profile is selected, wherein the third regenerative braking profile has lower regenerative braking than the first regenerative braking profile. At step 712, the first regenerative braking profile of the first vehicle is deactivated, wherein the first vehicle will coast upon lifting of an accelerator.

Additionally, the vehicle speed can be used by the vehicle's advanced driver-assistance systems (ADAS) to adjust the regenerative braking profile automatically. For example, if the vehicle's sensors detect that the vehicle is approaching a slower-moving vehicle or a stop sign, the system could automatically adjust the regenerative braking profile in anticipation of stopping or slowing down to a higher level to ensure constant deceleration by the regenerative braking system and not the friction brakes, and maximize energy capture.

In various embodiments, the individual steps of processes 100, 200, and 700 may be implemented by one or more components of the devices and systems of FIGS. 9, 10, 11 and 12. Although the present disclosure may describe certain steps of the processes as being implemented by certain components of the devices and systems of FIGS. 9, 10, 11 and 12 this is for purposes of illustration only, and it should be understood that other components of the devices and systems of FIGS. 9, 10, 11 and 12 may implement those steps instead.

FIG. 8 illustrates regenerative braking profiles based on vehicle speed, in accordance with some examples of the present disclosure. FIG. 8 shows a plurality of regenerative braking profiles based on a vehicle speed, VS. It is possible to adapt the regenerative braking profile of a HEV/EV based on vehicle speed. By measuring the speed of the vehicle, the EV's regenerative braking system can adjust the amount of energy captured during braking.

In the example profiles shown, when the VS of the first vehicle is below 30 mph there is no coasting zone 816 in the regenerative braking profile. As the VS increases, the size of the coasting zone 816 increases. The distribution of zones 812-816 are for illustrative purposes only, and a plurality of other distributions are considered within the scope of this disclosure. Importantly, there is a particular VS wherein the coasting zone 816 is at a maximum and the regen zone 812 is at a minimum. The minimum setting for a regen zone 812 may be no regen at all.

For example, if the EV is travelling at a high speed, the regenerative braking profile can be adjusted to capture less energy during lifting of the accelerator pedal. This allows the EV to maintain a higher speed and reduce the amount of deceleration, providing a better driving experience for the driver. On the other hand, if the EV is travelling at a low speed, such as in a city or a residential area, the regenerative braking profile can be adjusted to capture more energy during braking. This allows the EV to recharge the battery more quickly and extend the range of the vehicle.

This method can be combined with other systems and methodologies such as GPS-based settings, road condition detection, or vehicle headway to optimize the energy captured by the regenerative braking system and progress the overall performance of the EV. Furthermore, vehicle speed sensors are commonly used in vehicles and are widely available, hence they can be integrated easily into the EV's control system, allowing the EV's regenerative braking profile to be adjusted in real time based on the vehicle's speed.

Figure 9:
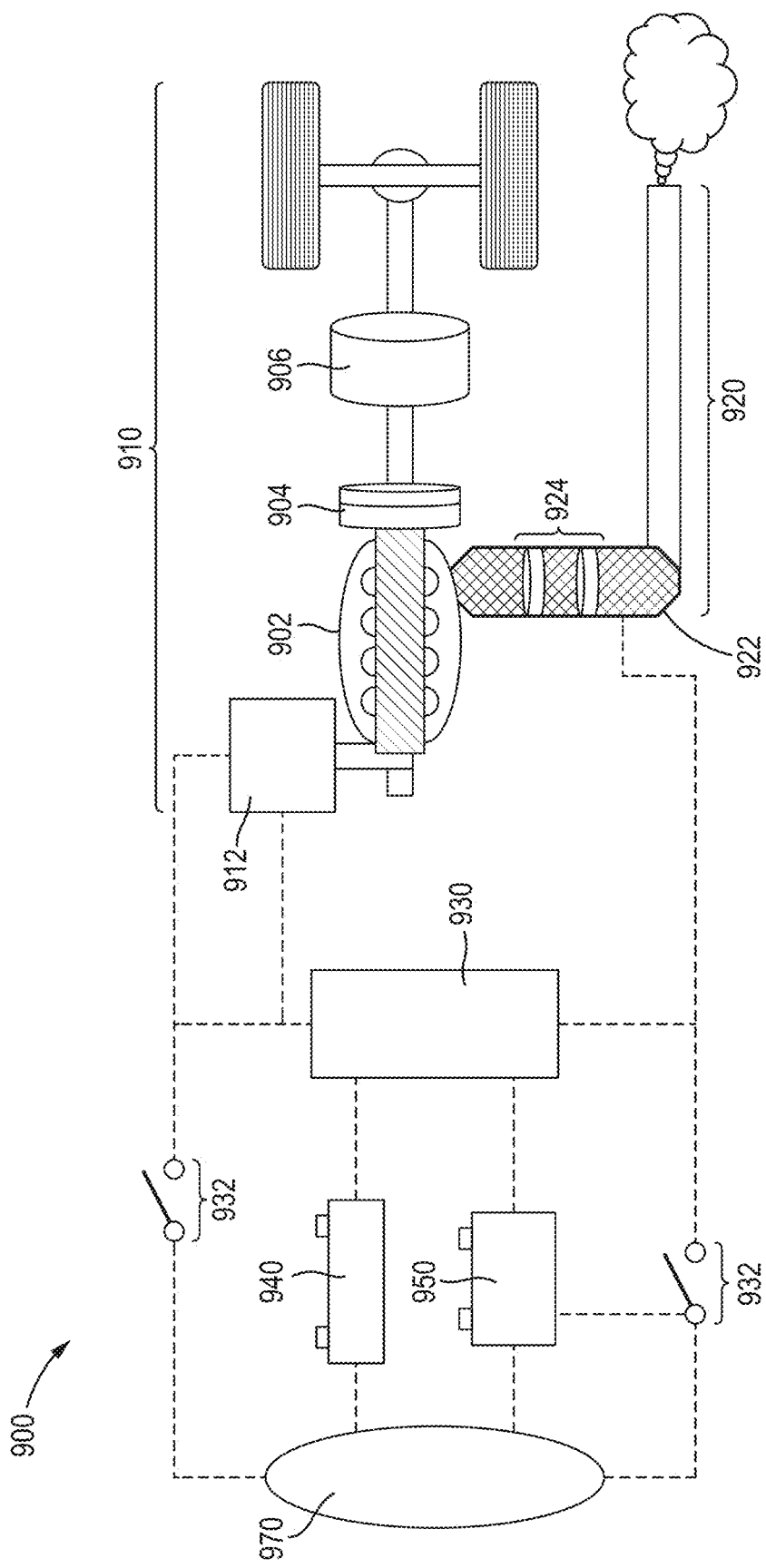
FIG. 9 is a block diagram of a control system for a hybrid electric vehicle, in accordance with some examples of the present disclosure.

FIG. 9 is a block diagram of a control system for a hybrid electric vehicle (HEV), in accordance with some examples of the present disclosure. In the example shown in FIG. 9, the power control system 900 is for an exemplary HEV system architecture, in accordance with at least one of the examples described herein. Each of the systems shown in FIG. 9 are communicatively and/or electrically coupled via controller 930 (illustrated by the dashed line connectors). Shown in FIG. 9 is a belt-integrated starter-generator (BISG) 912, which is a device that may apply positive torque and assist the engine in reducing the amount of work it has to do, or, in some examples, apply negative torque to generate electrical energy. The BISG 912 may be referred to as a motor generator. The BISG 912 is integrated into the drive train 910, along with engine 902, clutch 904, and transmission 908. In some examples, the BISG 912 transmits torque to the engine's crankshaft when it's operating as a hybrid drive motor, and the crankshaft transmits torque back to the BISG 912 when it operates as a generator, converting kinetic energy from the moving vehicle back into electricity, operating as a regenerative braking system. The BISG 912 is the component that applies regenerative braking in a HEV, when acting as a generator, when the pedal throttle falls into the regen zone of a regenerative braking profile, such as those described above.

In some examples, engine 902 has an exhaust system 920 comprising an aftertreatment system 922, which comprises a plurality of electronic exhaust gas heaters (eEGH) 924. The aftertreatment system 922 may further comprise a diesel particulate filter (DPF) or gasoline particulate filter (GPF), which are filters that capture and store exhaust soot, coke, and/or char, collectively referred to as particulate matter. Particulate filters are other forms of after-treatment utilized to reduce emissions from internal combustion engine (ICE) vehicles. particulate filters have a finite capacity, the trapped particulate matter periodically has to be emptied or 'burned off' to regenerate the particulate filter, which an eEGH may also be used to assist with. This regeneration process cleanly burns off the excess particular matter deposited in the filter, reducing the detrimental exhaust emission. In some examples, the regeneration process may be initiated in response to predicting that there will be a braking event. For example, if the amount of particulate matter within the after-treatment system is determined to be above a threshold and a regeneration process is required, the after-treatment system can wait until a prediction that a regenerative braking event will be made by the driver and then the eEGH can be activated to regenerate the after-treatment filters while extra energy is available from the regenerative braking event. Moreover, in some examples, there is also provided a selective catalytic reduction (SCR) system (not shown). An SCR is another emissions control technology system that injects a liquid-reductant agent through a special catalyst into the exhaust stream of engines, in particular diesel engines. The reductant source is usually automotive-grade urea, otherwise known as diesel exhaust fluid (DEF). The DEF sets off a chemical reaction that converts nitrogen oxides into nitrogen, water, and low amounts of carbon dioxide ($CO_2$), which is then expelled through the vehicle tailpipe. The exhaust system 920 may further comprise several sensors to detect the flue gas containing oxides of nitrogen (NOx) and oxides of sulphur (SOx), to ensure the final emissions are within a guideline amount.

In some examples, the exhaust system comprises an exhaust gas recovery system, which is enabled by an EGR switch (not shown). The EGR switch enables some or all exhaust gas, or the thermal energy of the exhaust gas, to be recirculated through the exhaust system to further compound the heating effect of the eEGH 924. The eEGH 924 typically comprises a heating element disposed within, or near, a catalyst. eEGHs are required in various use cases and will demand a power supply between 0-4 KW (0 to 4000 Watts) for example, depending on the use case. For example, the heating elements within the eEGHs will have a thermal output of 0-4 kW (0 to 4000 Watts). An eEGH typically has low inductance and therefore the power output (or thermal power output) can be changed rapidly. The eEGH produces thermal power to warm the catalyst but consumes electrical current to produce the thermal power. The eEGH demand is supported by a hybrid powertrain electrical system in an HEV or Partially HEV platform. For example, in a cold start use case, the eEGH may demand its full rated power (e.g., ~4 kW) to maintain after-treatment temperature. In some examples, the power control module (PCM) demands the eEGH-rated power from the HEV system for ~200 seconds. This load will be supported by the hybrid battery transiently until the e-machine can respond to support the load. However, in some use cases in which the e-machine can't support the total demand, the battery will need to support the eEGH power supply. Thus, in some examples, the eEGH is an ideal system to activate to reduce the battery SOC in anticipation of a regenerative braking event.

In the example shown in FIG. 9, the controller 930 is electrically connected to a low voltage (e.g., 12V) battery and bus 940, which is configured to supply electrical power to one or more low voltage accessories of the HEV, illustrated by load 970. The controller 930 is, for example, an engine control module (ECM), in operational communication with each of the BISG 912, the engine 902, one or more DC-DC converters (if required), the aftertreatment system 920, a plurality of eEGHs 924, the low voltage battery and bus 940, the high voltage battery and bus 950 (e.g., an HEV power system), and a plurality of other vehicle loads 970. The load 970 may be a compressor used to pump fluids such as water through the high voltage battery and bus 950, the one or more DC-DC converters, and the BISG 912. In some examples, the power control system 900 further comprises an air pump (not shown) used to transfer the thermal energy from the eEGH 924 to the after-treatment system, during, for example, low flow conditions. In such a case, the air pump would be fluidly connected to the engine exhaust system to draw air from the atmosphere through the eEGH 924 to transfer thermal energy from the heating elements in the eEGH 924 to the catalyst.

The present disclosure is not limited to the set-up shown in FIG. 9. For example, the controller 930 may be a stand-alone controller or any other appropriate controller of the hybrid vehicle. For example, the controller may, at least in part, be integrated with another controller of the vehicle. Furthermore, the controller 960 may be configured to operationally communicate with any one or more of the vehicle components shown in FIG. 9, and/or any other appropriate components of the vehicle. For example, controller 960 may be a stand-alone controller configured to operationally communicate with at least one high voltage accessory, an electric motor-generator, and an eEGH, to control the electrical power output of the high voltage battery 950. Typically, the BISG 912, when in generator mode and actively engaged in regenerative braking can be used to power load 970 directly, or store generated energy, via the controller 930, to the low voltage battery and bus 940 and/or high voltage battery and bus 950. A plurality of switches 932 can be used to electrically isolate components during the switching of the BISG 912 from motor to generator and the like.

While the example shown in FIG. 9 exemplifies the use of the control system 900 for an HEV, it is understood that the control system 900 may be implemented on an appropriate type of hybrid vehicle, such as a plug-in hybrid electric vehicle (PHEV), having one or more high voltage circuit components.

Figure 10:
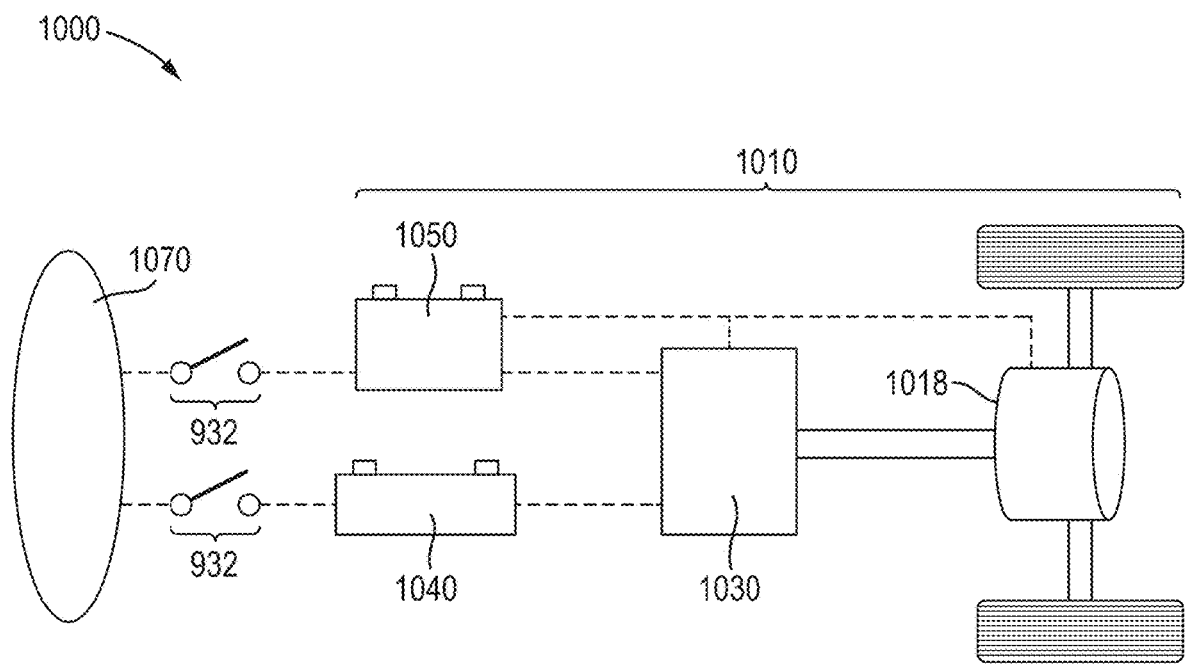
FIG. 10 is a block diagram of a control system for an electric vehicle, in accordance with some examples of the present disclosure.

FIG. 10 is a block diagram of a control system for an electric vehicle (EV), in accordance with some embodiments of the present disclosure. In the example shown in FIG. 10, the power control system 1000 is for an exemplary EV system architecture, in accordance with at least one of the examples described herein. Each of the systems shown in FIG. 10 are communicatively and/or electrically coupled via controller 1030 (illustrated by the dashed line connectors). Shown in FIG. 10 is an e-machine 1018, which is a device that may apply positive torque directly to the wheels of the EV, or, in some examples, apply negative torque to generate electrical energy. The e-machine 1018 may be referred to as a motor generator. In some examples, the e-machine transmits torque to the wheels via a crankshaft or transmission when it's operating as a motor, and the crankshaft transmits torque back to the e-machine 1018 when it operates as a generator, converting kinetic energy from the moving vehicle back into electricity. The e-machines 1018 is the component that applies regenerative braking in an EV, when acting as a generator, when the pedal throttle falls into the regen zone of a regenerative braking profile, such as those described above.

In the example shown in FIG. 10, the controller 1030 is electrically connected to a low voltage (e.g., 12V) battery and bus 1040, which is configured to supply electrical power to one or more low voltage accessories of the EV, illustrated by load 1070. The controller 1030 is, for example, an engine control module (ECM), in operational communication with each of the e-machine 1018, one or more DC-DC converters (if required, not shown), the low voltage battery and bus 1040, the high voltage battery and bus 1050 (e.g., an EV power system used to power the e-machine 1018), and a plurality of other vehicle loads 1070. The loads 1070 may be a compressor used to pump fluids such as water through the high voltage battery and bus 1050, the one or more DC-DC converters, and the e-machine 1018.

The present disclosure is not limited to the set-up shown in FIG. 10. For example, the controller 1030 may be a stand-alone controller or any other appropriate controller of the hybrid vehicle. For example, the controller may, at least in part, be integrated with another controller of the vehicle. Furthermore, the controller 1030 may be configured to operationally communicate with any one or more of the vehicle components shown in FIG. 10, and/or any other appropriate components of the vehicle. For example, controller 1030 may be a stand-alone controller configured to control the electrical power output of the high voltage battery 1050. Typically, the e-machine 1018, when in generator mode and actively engaged in regenerative braking can be used to power load 1070 directly, or store generated energy, via the controller 1030, to the low voltage battery and bus 1040 and/or high voltage battery and bus 1050. A plurality of switches 1032 can be used to electrically isolate components during the switching of the e-machines 1018 from motor to generator and the like.

While the example shown in FIG. 10 exemplifies the use of the control system 1000 for an EV, it is understood that the control system 1000 may be implemented on any appropriate type of electric vehicle, having one or more high-voltage circuit components.

Figure 11:
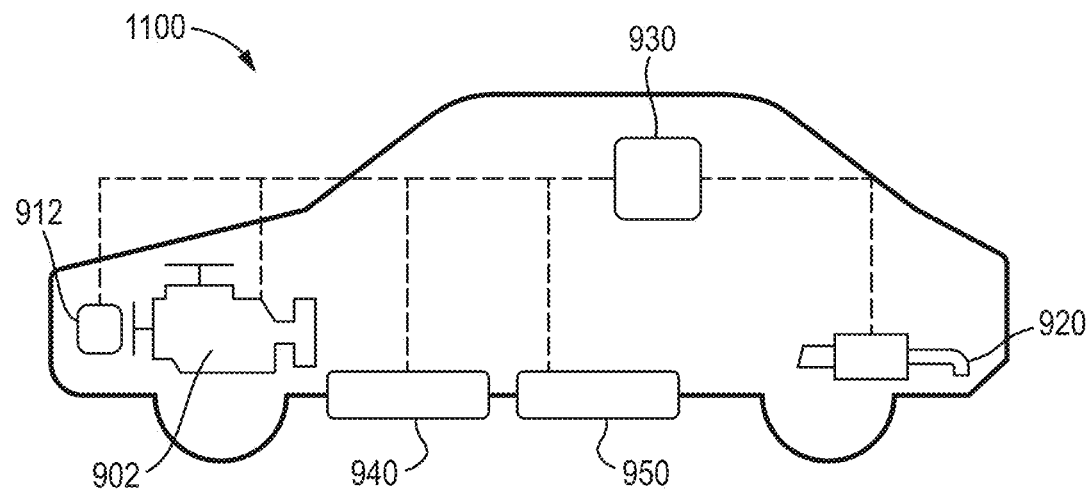
FIG. 11 illustrates a vehicle comprising an engine and an exemplary control system, in accordance with at least one of the examples described herein.

FIG. 11 illustrates a vehicle comprising an engine and an exemplary control system, in accordance with at least one of the examples described herein. FIG. 11 illustrates a vehicle 1100 comprising an exemplary exhaust system 920, a control module 930, a low voltage battery and bus 940, and a high voltage battery and bus 950, in accordance with at least one of the examples described herein. According to some examples, there is provided a vehicle 1100 comprising the control system 900, 1000 of FIGS. 9 and 10, as described above. 8. In some examples, the vehicle further comprises a drive train comprising an e-machine 912, an engine 902, clutch and transmission (not shown).

The methods described above may be implemented on vehicle 1100. Each of the systems in the vehicle is communicatively coupled via controller 930 (illustrated by the dashed line connectors). However, the present disclosure is not limited to the set-up shown in FIG. 11. For example, the controller 930 may be any appropriate type of controller, such as a stand-alone controller, or any other appropriate controller of the hybrid vehicle. For example, controller 930 may, at least in part, be integrated with another controller of the vehicle. Furthermore, the controller 930 may be configured to operationally communicate with any one or more of the vehicle components shown in FIGS. 9-10, and/or any other appropriate components of the vehicle. For example, controller 930 may be a stand-alone controller at least partially configured to operationally communicate with at least one low-voltage accessory, an electric generator, and an e-machine, to control torque demand on engine 902. Furthermore, it is understood that controller 930 may be configured to carry out one or more of the above-disclosed electrical power control methods for regenerative braking for an HEV or EV alike.

Figure 12:
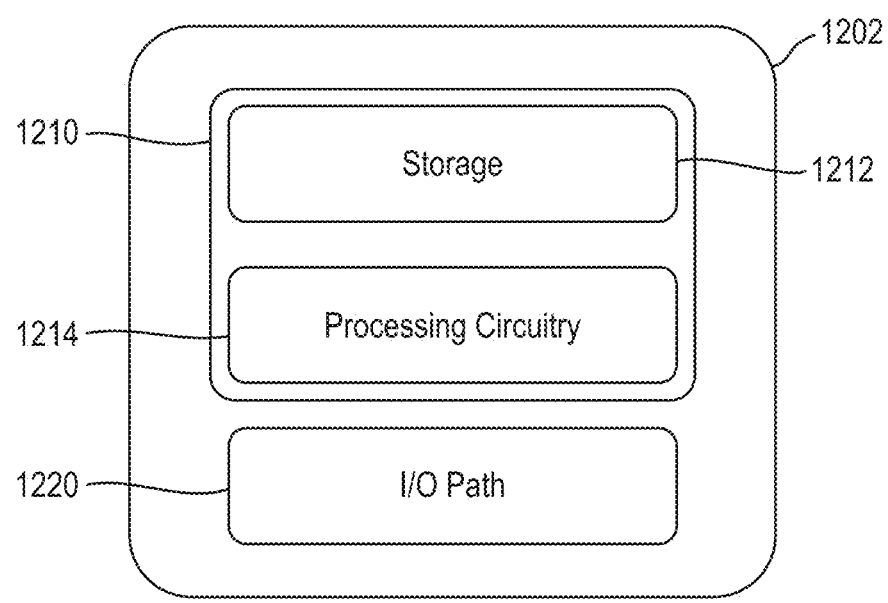
FIG. 12 illustrates a block diagram of a computing module, in accordance with some examples of the disclosure.

FIG. 12 illustrates a block diagram of a computing module, e.g., control circuitry, in accordance with some examples of the disclosure. In some examples, computing module 1202 may be communicatively connected to a user interface (not shown). In some examples, computing module 1202, may be the controller 930 and/or controller 1030 of systems 900, 1000 or of vehicle 1100 as described with reference to FIGS. 9-11 above. In some examples, computing module 1202 may include processing circuitry, control circuitry, and storage (e.g., RAM (Random Access Memory), ROM (Read Only Memory), hard disk, removable disk, etc.). Computing module 1202 may include an input/output path 1220. I/O path 1220 may provide device information, or other data, over a local area network (LAN) or wide area network (WAN), and/or other content and data to control circuitry 1210, which includes processing circuitry 1214 and storage 1212. Control circuitry 1210 may be used to send and receive commands, requests, signals (digital and analogue), and other suitable data using I/O path 1220, which may comprise I/O circuitry. I/O path 1220 may connect control circuitry 1210 (and specifically processing circuitry 1014) to one or more communications paths. In some examples, computing module 1202 may be an onboard computer of a vehicle, such as a vehicle 1100.

Control circuitry 1210 may be based on any suitable processing circuitry such as processing circuitry 1214. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some examples, processing circuitry may be distributed across multiple separate processors or processing units, for example, multiple of the same type of processing units (e.g. two Intel Core i7 processors) or multiple different processors (e.g., an Intel Core i5 processor and an Intel Core i7 processor). In some examples, control circuitry 1214 executes instructions for computing module 1002 stored in memory (e.g., storage 1212).

The memory may be an electronic storage device provided as storage 1212, which is part of control circuitry 1210. As referred to herein, the phrase "electronic storage device" or "storage device" should be understood to mean any device (physical or cloud-based) for storing electronic data, computer software, or firmware, such as random-access memory, read-only memory, hard drives, solid-state devices, quantum storage devices, or any other suitable fixed or removable storage devices, and/or any combination of the same. The non-volatile memory may also be used (e.g., to launch a boot-up routine and other instructions). Storage 1212 may be subdivided into different spaces such as kernel space and user space. Kernel space is a portion of memory or storage that is, e.g., reserved for running a privileged operating system kernel, kernel extensions, and most device drivers. User space may be considered an area of memory or storage where application software generally executes and is kept separate from kernel space so as to not interfere with system-vital processes. Kernel mode may be considered as a mode when control circuitry 1010 has permission to operate on data in kernel space, while applications running in user mode must request control circuitry 1210 to perform tasks in kernel mode on its behalf.

Computing module 1202 may be coupled to a communications network, e.g., for retrieving data from storage 1012. The communication network may be one or more networks including the Internet, a mobile phone network, a mobile voice or data network (e.g., a 3G, 4G, 5G or LTE network), a mesh network, peer-to-peer network, cable network, cable reception (e.g., coaxial), microwave link, DSL (Digital Subscriber Line) reception, cable internet reception, fibre reception, over-the-air infrastructure or other types of communications network or combinations of communications networks. Computing module 1202 may be coupled to a second communication network (e.g., Bluetooth, Near Field Communication, service provider proprietary networks, or wired connection) to retrieve information such as regenerative braking profiles. Paths may separately or together include one or more communications paths, such as a satellite path, a fiber-optic path, a cable path, a path that supports Internet communications, free-space connections (e.g., for broadcast or other wireless signals), or any other suitable wired or wireless communications path or combination of such paths.

In some examples, the control circuitry 1210 is configured to carry out any of the methods as described herein. For example, storage 1212 may be a non-transitory computer-readable medium having instructions encoded thereon, to be carried out by processing circuitry 1214, which cause control circuitry 1210 to carry out a method of controlling a regenerative braking system comprising a battery.

It should be understood that the examples described above are not mutually exclusive with any of the other examples described with reference to FIGS. 1-12. The order of the description of any examples is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

Other variations to the disclosed examples can be understood and effected by those skilled in the art in practising the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The disclosure of this invention is made to illustrate the general principles of the systems and processes discussed above and is intended to be illustrative rather than limiting. More generally, the above disclosure is meant to be exemplary and not limiting and the scope of the invention is best determined by reference to the appended claims. In other words, only the claims that follow are meant to set bounds as to what the present disclosure includes.

While the present disclosure is described with reference to particular example applications, it shall be appreciated that the invention is not limited thereto. It will be apparent to those skilled in the art that various modifications and improvements may be made without departing from the scope and spirit of the present invention. Those skilled in the art would appreciate that the actions of the processes discussed herein may be omitted, modified, combined, and/or rearranged, and any additional actions may be performed without departing from the scope of the invention.

Any system feature as described herein may also be provided as a method feature and vice versa. As used herein, means plus function features may be expressed alternatively in terms of their corresponding structure. It shall be further appreciated that the systems and/or methods described above may be applied to, or used in accordance with, other systems and/or methods.

Any feature in one aspect may be applied to other aspects, in any appropriate combination. In particular, method aspects may be applied to system aspects, and vice versa. Furthermore, any, some, and/or all features in one aspect can be applied to any, some, and/or all features in any other aspect, in any appropriate combination. It should also be appreciated that particular combinations of the various features described and defined in any aspect can be implemented and/or supplied and/or used independently.

The following items pertain to further examples of the present disclosure:

Example 1 is a method for selecting a regenerative braking profile of a first vehicle, the method comprising: receiving a plurality of driving signals from the first vehicle associated with a first driver of the first vehicle; detecting that the first driver is attempting to maintain a steady vehicle speed based on the driving signals from the first vehicle; and in response to the detection of the first driver attempting to maintain a steady vehicle speed, selecting a first regenerative braking profile based on the plurality of driving signals.

Example 2 comprises Example 1, wherein the driving signals comprise a pedal oscillation profile.

Example 3 comprises Examples 1-2, wherein the pedal oscillation profile of the first driver comprises a minimum, and further comprising adjusting the first regenerative braking profile to move a regenerative braking point below the minimum in the pedal oscillation profile.

Example 4 comprises Examples 1-3, wherein the pedal oscillation profile comprises an accelerator signal, a brake signal, and/or a speed signal of the first vehicle.

Example 5 comprises Examples 1-4, further comprising: detecting a second vehicle in front of the first vehicle; determining that the second vehicle is within a threshold distance; and selecting a second regenerative braking profile, wherein the second regenerative braking profile has higher regenerative braking than the first regenerating braking profile.

Example 6 comprises Examples 1-5, further comprising: determining that the second vehicle is outside the threshold distance; and selecting a third regenerative braking profile, wherein the third regenerative braking profile has lower regenerative braking than the first regenerative braking profile.

Example 7 comprises Examples 1-6, further comprising: detecting a clear headway in front of the first vehicle; and in response, deactivating the first regenerative braking profile of the first vehicle, wherein the first vehicle will coast upon lifting of an accelerator.

Example 8 comprises Examples 1-7, further comprising: determining the first vehicle's speed; determining that the first vehicle's speed is below a first threshold speed; and selecting a second regenerative braking profile, wherein the second regenerative braking profile has higher regenerative braking than the first regenerating braking profile.

Example 9 comprises Examples 1-8, further comprising: determining that the first vehicle's speed is above the first threshold speed but below a second threshold speed; and selecting a third regenerative braking profile, wherein the third regenerative braking profile has lower regenerative braking than the first regenerative braking profile.

Example 10 comprises Examples 1-9, further comprising: determining that the first vehicle's speed is above the first threshold speed and above the second threshold speed; and in response, deactivating the first regenerative braking profile of the first vehicle, wherein the first vehicle will coast upon lifting of an accelerator.

Example 11 comprises a regenerative braking system for a vehicle, the system comprising storage, with a plurality of regenerative braking profiles stored thereon, and a controller, the controller configured to: receive a plurality of driving signals from the vehicle associated with a first driver of the vehicle; detect that the first driver is attempting to maintain a steady vehicle speed based on the driving signals from the vehicle; and in response to the detection of the first driver attempting to maintain a steady vehicle speed, select a first regenerative braking profile from the storage based on the plurality of driving signals.

Example 12 comprises Example 11, wherein the driving signals comprise a pedal oscillation profile.

Example 13 comprises Examples 11-12, wherein the pedal oscillation profile of the first driver comprises a minimum, and the controller further configured to adjust the first regenerative braking profile to move a regenerative braking point below the minimum in the pedal oscillation profile.

Example 14 comprises Examples 11-13, wherein the pedal oscillation profile comprises an accelerator signal, a brake signal, and/or a speed signal of the first vehicle.

Example 15 comprises Examples 11-14, the controller further configured to: detect a second vehicle in front of the first vehicle; determine that the second vehicle is within a threshold distance; and select a second regenerative braking profile, wherein the second regenerative braking profile has higher regenerative braking than the first regenerating braking profile.

Example 16 comprises Examples 11-15, the controller further configured to: determine that the second vehicle is outside the threshold distance; and selecting a third regenerative braking profile, wherein the third regenerative braking profile has lower regenerative braking than the first regenerative braking profile.

Example 17 comprises Examples 11-16, the controller further configured to: detect a clear headway in front of the first vehicle; and in response, deactivate the first regenerative braking profile of the first vehicle, wherein the first vehicle will coast upon lifting of an accelerator.

Example 18 comprises Examples 11-17, the controller further configured to: determine the first vehicle's speed; determine that the first vehicle's speed is below a first threshold speed; and select a second regenerative braking profile, wherein the second regenerative braking profile has higher regenerative braking than the first regenerating braking profile.

Example 19 comprises Examples 11-18, the controller further configured to: determine that the first vehicle's speed is above the first threshold speed but below a second threshold speed; and select a third regenerative braking profile, wherein the third regenerative braking profile has lower regenerative braking than the first regenerative braking profile.

Example 20 comprises Examples 11-19, the controller further configured to: determine that the first vehicle's speed is above the first threshold speed and above the second threshold speed; and in response, deactivate the first regenerative braking profile of the first vehicle, wherein the first vehicle will coast upon lifting of an accelerator.

Example 21 comprises a vehicle comprising a regenerative braking system, the system comprising storage, with a plurality of regenerative braking profiles stored thereon, and a controller, the controller configured to: receive a plurality of driving signals from the vehicle associated with a first driver of the vehicle; detect that the first driver is attempting to maintain a steady vehicle speed based on the driving signals from the vehicle; and in response to the detection of the first driver attempting to maintain a steady vehicle speed, select a first regenerative braking profile from the storage based on the plurality of driving signals.

Example 22 comprises Example 21, wherein the driving signals comprise a pedal oscillation profile.

Example 23 comprises Examples 21-22, wherein the pedal oscillation profile of the first driver comprises a minimum, and the controller further configured to adjust the first regenerative braking profile to move a regenerative braking point below the minimum in the pedal oscillation profile.

Example 24 comprises Examples 21-23, wherein the pedal oscillation profile comprises an accelerator signal, a brake signal, and/or a speed signal of the first vehicle.

Example 25 comprises Examples 21-24, the controller further configured to: detect a second vehicle in front of the first vehicle; determine that the second vehicle is within a threshold distance; and select a second regenerative braking profile, wherein the second regenerative braking profile has higher regenerative braking than the first regenerating braking profile.

Example 26 comprises Examples 21-25, the controller further configured to: determine that the second vehicle is outside the threshold distance; and selecting a third regenerative braking profile, wherein the third regenerative braking profile has lower regenerative braking than the first regenerative braking profile.

Example 27 comprises Examples 21-26, the controller further configured to: detect a clear headway in front of the first vehicle; and in response, deactivate the first regenerative braking profile of the first vehicle, wherein the first vehicle will coast upon lifting of an accelerator.

Example 28 comprises Examples 21-27, the controller further configured to: determine the first vehicle's speed; determine that the first vehicle's speed is below a first threshold speed; and select a second regenerative braking profile, wherein the second regenerative braking profile has higher regenerative braking than the first regenerating braking profile.

Example 29 comprises Examples 21-28, the controller further configured to: determine that the first vehicle's speed is above the first threshold speed but below a second threshold speed; and select a third regenerative braking profile, wherein the third regenerative braking profile has lower regenerative braking than the first regenerative braking profile.

Example 30 comprises Examples 21-29, the controller further configured to: determine that the first vehicle's speed is above the first threshold speed and above the second threshold speed; and in response, deactivate the first regenerative braking profile of the first vehicle, wherein the first vehicle will coast upon lifting of an accelerator.

Example 31 is a non-transitory computer-readable medium, having instructions recorded thereon for selecting a regenerative braking profile of a first vehicle, the instructions comprising: receiving a plurality of driving signals from the first vehicle associated with a first driver of the first vehicle; detecting that the first driver is attempting to maintain a steady vehicle speed based on the driving signals from the first vehicle; and in response to the detection of the first driver attempting to maintain a steady vehicle speed, selecting a first regenerative braking profile based on the plurality of driving signals.

Example 32 comprises Example 31, wherein the driving signals comprise a pedal oscillation profile.

Example 33 comprises Examples 31-32, wherein the pedal oscillation profile of the first driver comprises a minimum, and further comprising adjusting the first regenerative braking profile to move a regenerative braking point below the minimum in the pedal oscillation profile.

Example 34 comprises Examples 31-33, wherein the pedal oscillation profile comprises an accelerator signal, a brake signal, and/or a speed signal of the first vehicle.

Example 35 comprises Examples 31-34, further comprising: detecting a second vehicle in front of the first vehicle; determining that the second vehicle is within a threshold distance; and selecting a second regenerative braking profile, wherein the second regenerative braking profile has higher regenerative braking than the first regenerating braking profile.

Example 36 comprises Examples 31-35, further comprising: determining that the second vehicle is outside the threshold distance; and selecting a third regenerative braking profile, wherein the third regenerative braking profile has lower regenerative braking than the first regenerative braking profile.

Example 37 comprises Examples 31-36, further comprising: detecting a clear headway in front of the first vehicle; and in response, deactivating the first regenerative braking profile of the first vehicle, wherein the first vehicle will coast upon lifting of an accelerator.

Example 38 comprises Examples 31-37, further comprising: determining the first vehicle's speed; determining that the first vehicle's speed is below a first threshold speed; and selecting a second regenerative braking profile, wherein the second regenerative braking profile has higher regenerative braking than the first regenerating braking profile.

Example 39 comprises Examples 31-38, further comprising: determining that the first vehicle's speed is above the first threshold speed but below a second threshold speed; and selecting a third regenerative braking profile, wherein the third regenerative braking profile has lower regenerative braking than the first regenerative braking profile.

Example 40 comprises Examples 31-39, further comprising: determining that the first vehicle's speed is above the first threshold speed and above the second threshold speed; and in response, deactivating the first regenerative braking profile of the first vehicle, wherein the first vehicle will coast upon lifting of an accelerator.

What is claimed is:

1. A method for activating a regenerative braking profile of a first vehicle, the method comprising:
   receiving a plurality of driving signals from the first vehicle associated with a first driver of the first vehicle, wherein:
      the plurality of driving signals comprise a pedal oscillation profile; and
      the pedal oscillation profile comprises a minimum and a coasting zone;
   detecting that the first driver is attempting to maintain a steady vehicle speed based on the plurality of driving signals from the first vehicle;
   in response to the detection of the first driver attempting to maintain a steady vehicle speed, activating a first regenerative braking profile based on the plurality of driving signals;
   adjusting the first regenerative braking profile to move a regenerative braking point below the minimum in the pedal oscillation profile such that the coasting zone comprises the minimum; and
   operating a regenerative braking system to harvest electrical energy according to the adjusted first regenerative braking profile.

2. The method of claim 1, wherein the pedal oscillation profile comprises:
   an accelerator signal, a brake signal, or a speed signal of the first vehicle.

3. The method of claim 1, further comprising:
   detecting a second vehicle in front of the first vehicle;
   determining that the second vehicle is within a threshold distance;
   activating a second regenerative braking profile, wherein the second regenerative braking profile has a higher level of regenerative braking than the first regenerative braking profile.

4. The method of claim 3, further comprising:
   determining that the second vehicle is outside the threshold distance; and
   activating a third regenerative braking profile, wherein the third regenerative braking profile has a lower level of regenerative braking than the first regenerative braking profile.

5. The method of claim 1, further comprising:
   detecting a clear headway in front of the first vehicle; and
   in response, deactivating the first regenerative braking profile of the first vehicle, to allow the first vehicle to coast upon lifting of an accelerator pedal.

6. The method of claim 1, further comprising:
   determining the first vehicle's speed;
   determining that the first vehicle's speed is below a first threshold speed; and
   activating a second regenerative braking profile, wherein the second regenerative braking profile has a higher level of regenerative braking than the first regenerative braking profile.

7. The method of claim 6, further comprising:
   determining that the first vehicle's speed is above the first threshold speed but below a second threshold speed; and
   activating a third regenerative braking profile, wherein the third regenerative braking profile has a lower level of regenerative braking than the first regenerative braking profile.

8. The method of claim 7, further comprising:
   determining that the first vehicle's speed is above the first threshold speed and above the second threshold speed; and
   in response, deactivating the first regenerative braking profile of the first vehicle, to allow the first vehicle to coast upon lifting of an accelerator pedal.

9. A regenerative braking system for a first vehicle, the system comprising:
   input/output circuitry configured to receive a plurality of driving signals from the first vehicle associated with a first driver of the first vehicle, wherein:
      the plurality of driving signals comprise a pedal oscillation profile; and
      the pedal oscillation profile comprises a minimum and a coasting zone;
   control circuitry configured to:
      detect that the first driver is attempting to maintain a steady vehicle speed based on the plurality of driving signals from the first vehicle;
      in response to the detection of the first driver attempting to maintain a steady vehicle speed, activate a first regenerative braking profile from storage based on the plurality of driving signals;
      adjusting the first regenerative braking profile to move a regenerative braking point below the minimum in the pedal oscillation profile such that the coasting zone comprises the minimum; and
   operate the regenerative braking system to harvest electrical energy according to the adjusted first regenerative braking profile.

10. The system of claim 9, wherein the pedal oscillation profile comprises: an accelerator signal, a brake signal, or a speed signal of the first vehicle.

11. The system of claim 9, the control circuitry further configured to:
- detect a second vehicle in front of the first vehicle;
- determine that the second vehicle is within a threshold distance; and
- activate a second regenerative braking profile, wherein the second regenerative braking profile has a higher level of regenerative braking than the first regenerative braking profile.

12. The system of claim 11, the control circuitry further configured to:
- determine that the second vehicle is outside the threshold distance; and
- activate a third regenerative braking profile, wherein the third regenerative braking profile has a lower level of regenerative braking than the first regenerative braking profile.

13. The system of claim 9, the control circuitry further configured to:
- detect a clear headway in front of the first vehicle; and
- in response, deactivate the first regenerative braking profile of the first vehicle, to allow the first vehicle to coast upon lifting of an accelerator pedal.

14. The system of claim 9, the control circuitry further configured to:
- determine the first vehicle's speed;
- determine that the first vehicle's speed is below a first threshold speed; and
- activate a second regenerative braking profile, wherein the second regenerative braking profile has a higher level of regenerative braking than the first regenerating braking profile.

15. A vehicle comprising the regenerative braking system of claim 9.

16. A non-transitory computer-readable medium, having instructions recorded thereon for activating a regenerative braking profile of a first vehicle, the instructions, when executed by control circuitry, cause the control circuitry to:
- receive a plurality of driving signals from the first vehicle associated with a first driver of the first vehicle, wherein:
  - the plurality of driving signals comprise a pedal oscillation profile; and
  - the pedal oscillation profile comprises a minimum and a coasting zone;
- detect that the first driver is attempting to maintain a steady vehicle speed based on the plurality of driving signals from the first vehicle;
- in response to the detection of the first driver attempting to maintain a steady vehicle speed, activate a first regenerative braking profile based on the plurality of driving signals;
- adjusting the first regenerative braking profile to move a regenerative braking point below the minimum in the pedal oscillation profile such that the coasting zone comprises the minimum; and
- operating a regenerative braking system to harvest electrical energy according to the adjusted first regenerative braking profile.

* * * * *